United States Patent
Liu et al.

(10) Patent No.: US 12,391,242 B2
(45) Date of Patent: Aug. 19, 2025

(54) METHOD AND APPARATUS FOR DETERMINING TRAVEL PATH BOUND, VEHICLE, STORAGE MEDIUM, AND TERMINAL

(71) Applicant: Momenta (Suzhou) Technology Co., Ltd., Suzhou (CN)

(72) Inventors: Si Liu, Suzhou (CN); Xu Ran, Suzhou (CN); Bin Wang, Suzhou (CN); Rui Wang, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 190 days.

(21) Appl. No.: 18/243,306

(22) Filed: Sep. 7, 2023

(65) Prior Publication Data
US 2024/0001913 A1 Jan. 4, 2024

Related U.S. Application Data

(63) Continuation of application No. PCT/CN2022/104434, filed on Jul. 7, 2022.

(30) Foreign Application Priority Data

Jun. 30, 2022 (CN) .................. 202210760229.X

(51) Int. Cl.
*B60W 30/095* (2012.01)
*B60W 30/09* (2012.01)
*B60W 60/00* (2020.01)

(52) U.S. Cl.
CPC ........ *B60W 30/09* (2013.01); *B60W 30/0956* (2013.01); *B60W 60/001* (2020.02); *B60W 2554/80* (2020.02)

(58) Field of Classification Search
CPC ............. B60W 30/09; B60W 30/0956; B60W 60/001; B60W 2554/80; B60W 30/095; G05D 1/0214
See application file for complete search history.

(56) References Cited

U.S. PATENT DOCUMENTS 9,227,632 B1 1/2016 Lee
2021/0053563 A1* 2/2021 Li .................. G05D 1/0212
(Continued)

FOREIGN PATENT DOCUMENTS

| CN | 107145147 A | 9/2017 |
| CN | 107672588 A | 2/2018 |

(Continued)

OTHER PUBLICATIONS

China Patent Office, International Search Report, PCT/CN2022/104434, Mailed Dec. 29, 2022, 5 pages.
(Continued)

*Primary Examiner* — Daniel M. Robert
(74) *Attorney, Agent, or Firm* — Geza C Ziegler, Jr.

(57) ABSTRACT

The present invention provides a method and an apparatus for determining travel path bound, a vehicle, a storage medium and a terminal. The method includes: under a first coordinate system, according to contour point positions respectively corresponding to a vehicle and an obstacle in a path trajectory, determining a collision-anticipated overlap corner position; based on a trajectory normal of the vehicle and the overlap corner position, determining a contour corner overlap line and a decision corner reference line; if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle; under a second coordinate (Continued)

system, based on the collision-avoiding distance, generating a travel path bound.

20 Claims, 6 Drawing Sheets

(56) References Cited

U.S. PATENT DOCUMENTS

2022/0204029 A1\* 6/2022 Chen .................. G01S 17/42
2024/0001913 A1\* 1/2024 Liu .................. B60W 30/095

FOREIGN PATENT DOCUMENTS

| CN | 111309013 A | | 6/2020 | |
|----|----|----|----|----|
| CN | 111674390 A | | 9/2020 | |
| CN | 111750887 A | \* | 10/2020 | ......... G01C 21/3415 |
| CN | 112572472 A | \* | 3/2021 | ........ B60W 30/0956 |
| WO | 2012039004 A1 | | 3/2012 | |
| WO | 2022021910 A1 | | 2/2022 | |

OTHER PUBLICATIONS

China Patent Office, Written Opinion of the International Searching Authority, PCT/CN2022/104434, Dec. 29, 2022, 4 pages.

\* cited by examiner

METHOD AND APPARATUS FOR DETERMINING TRAVEL PATH BOUND, VEHICLE, STORAGE MEDIUM, AND TERMINAL

CROSS-REFERENCE TO RELATED APPLICATIONS

This application is a continuation of International Application No. PCT/CN2022/104434, filed on Jul. 7, 2022, which claims priority to Chinese Patent Application No. 202210760229.X, filed on Jun. 30, 2022. The disclosures of the aforementioned applications are hereby incorporated by reference in their entireties.

TECHNICAL FIELD

The present invention relates to the field of self-driving technology, and in particular to a method and an apparatus for determining a travel path bound, a vehicle, a storage medium, and a terminal.

BACKGROUND

Along with rapid development of vehicle self-driving technology, vehicle collision avoidance is controlled more and more finely. During a turning collision detection process of a vehicle, a control decision for the vehicle is determined in combination with the collision detection of an obstacle, thus achieving collision avoidance.

At present, during detection of an obstacle in vehicle turning process, under a Frenet coordinate system constructed with a distance along a road and a distance off a center line, based on prediction information of the obstacle and a travel trajectory of a vehicle, whether the vehicle has a transverse avoiding space is usually determined, so as to set a path bound as a path bound of path planning decision based on the transverse avoiding space. However, in a case of an excessively-large turning curvature, there may be too conservative or radical case in setting a path bound based on a vehicle and a center line of an obstacle, leading to inability to satisfy the needs for bound collision avoidance based on vehicle contour, and thus generating a large path bound error. Hence, in a case of an excessively-large turning curvature, there will be a larger risk of colliding with the obstacle, thus resulting in a poor accuracy of performing path planning decision with a path bound as a constraint condition.

SUMMARY

In view of this, the present invention provides a method and an apparatus for determining a travel path bound, a vehicle, a storage medium, and a terminal, with the main purpose of solving the existing problem of the accuracy of performing path planning decision based on path bound in a large-curvature turning process.

According to one aspect of the present invention, there is provided a method of determining a travel path bound, including:
under a first coordinate system, according to contour point positions respectively corresponding to a vehicle and an obstacle in a path trajectory, determining a collision-anticipated overlap corner position;
based on a trajectory normal of the vehicle and the overlap corner position, determining a contour corner overlap line and a decision corner reference line, wherein the decision corner reference line is parallel to the trajectory normal, and the contour corner overlap line is covered, in an overlap way, on a collision-anticipated contour edge of the vehicle or the obstacle;
if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle;
under a second coordinate system, based on the collision-avoiding distance, generating a path bound for a path planning decision.

Furthermore, the overlap corner position includes at least one primary overlap corner position and two auxiliary overlap corner positions, and based on the overlap corner position, the decision corner reference line and the contour corner positions on the contour corner overlap line, determining the collision-avoiding distance of the vehicle includes:
if the primary overlap corner position is same as a vehicle contour corner position of the vehicle, based on the primary overlap corner position, obstacle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the obstacle and the obstacle contour corner positions;
if the primary overlap corner position is same as an obstacle contour corner position of the obstacle, based on the primary overlap corner position, the vehicle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the vehicle and the vehicle contour corner positions.

Furthermore, based on the primary overlap corner position, the vehicle contour corner positions or the obstacle contour corner positions, and the auxiliary overlap corner positions, constructing the collision-avoiding translation line, and based on the primary overlap corner position and the second intersection position between the collision-avoiding translation line and the decision corner reference line, determining the collision-avoiding distance of the vehicle include:
based on vector directions of the auxiliary overlap corner positions and the primary overlap corner position relative to the trajectory normal, selecting a target auxiliary overlap corner position;
based on the target auxiliary overlap corner position and the primary overlap corner position, constructing a reference translation line, and based on a slope of the reference translation line and the vehicle contour corner positions or the obstacle contour corner positions, constructing the collision-avoiding translation line;

determining the second intersection position between the collision-avoiding translation line and the decision corner reference line and determining a distance between the second intersection position and the primary overlap corner position as the collision-avoiding distance.

Furthermore, based on the slope of the reference translation line and the vehicle contour corner positions or the obstacle contour corner positions, constructing the collision-avoiding translation line includes:

based on vector directions of the vehicle contour corner positions or the obstacle contour corner positions and the primary overlap corner position relative to the trajectory normal, selecting a target vehicle contour corner position or a target obstacle contour corner position, and based on the slope of the reference translation line and the target vehicle contour corner position or the target obstacle contour corner position, constructing the collision-avoiding translation line.

Furthermore, based on the trajectory normal of the vehicle and the overlap corner position, determining the contour corner overlap line and the decision corner reference line includes:

based on two auxiliary overlap corner positions in the overlap corner position, constructing the contour corner overlap line, and based on the primary overlap corner position in the overlap corner position and the slope of the trajectory normal, constructing the decision corner reference line.

Furthermore, after, based on the trajectory normal of the vehicle and the overlap corner position, determining the contour corner overlap line and the decision corner reference line, the method further includes:

if the first intersection position between the contour corner overlap line and the decision corner reference line is located on the contour edge, determining a distance between the first intersection position and the primary overlap corner position in the overlap corner position as the collision-avoiding distance.

Furthermore, under the second coordinate system, based on the collision-avoiding distance, generating the path bound for the path planning decision includes:

transforming the collision-avoiding distance into a collision-avoiding length under the second coordinate system;

based on a transverse distance between a target trajectory point in the path trajectory and the vehicle under the second coordinate system, coupling the collision-avoiding length with a decision length to obtain the path bound for the path planning decision.

Furthermore, before, under the first coordinate system, according to the contour point positions respectively corresponding to the vehicle and the obstacle in the path trajectory, determining the collision-anticipated overlap corner position, the method further includes:

under the second coordinate system, obtaining the path trajectory of the vehicle in a prediction trajectory frame, and transforming the path trajectory to be under the first coordinate system;

under the first coordinate system, based on a vehicle contour of the vehicle, determining vehicle contour point positions of the vehicle at the target trajectory points in the path trajectory;

under the first coordinate system, based on a perception system and/or a path map, obtaining at least one obstacle contour point position of the obstacle matching the target trajectory points in the path trajectory.

Furthermore, based on the vehicle contour of the vehicle, determining the vehicle contour point positions of the vehicle at the target trajectory points in the path trajectory includes:

calculating a heading angle of the target trajectory points in the path trajectory, and based on the heading angle and the vehicle contour, determining the vehicle contour point positions of the vehicle, wherein the contour point positions include four corner positions of the vehicle.

Furthermore, before, based on the trajectory normal of the vehicle and the overlap corner position, determining the contour corner overlap line and the decision corner reference line, the method further includes:

obtaining a central point position of the vehicle and determining a perpendicular direction of the path trajectory;

based on the perpendicular direction and the central point position, constructing the trajectory normal of the vehicle.

According to one aspect of the present invention, there is provided a method of planning a trajectory, including:

according to the above method of determining a travel path bound, determining a travel path bound of a vehicle;

based on the travel path bound, determining a travel trajectory of the vehicle.

According to one aspect of the present invention, there is provided an apparatus for determining a travel path bound, including:

a first determining module, configured to, under a first coordinate system, according to contour point positions respectively corresponding to a vehicle and an obstacle in a path trajectory, determine a collision-anticipated overlap corner position;

a second determining module, configured to, based on a trajectory normal of the vehicle and the overlap corner position, determine a contour corner overlap line and a decision corner reference line, where the decision corner reference line is parallel to the trajectory normal, and the contour corner overlap line is covered, in an overlap way, on a collision-anticipated contour edge of the vehicle or the obstacle;

a third determining module, configured to, if a first intersection position between the contour corner overlap line and the decision corner reference line is not located on the contour edge, based on the overlap corner position, the decision corner reference line and contour corner positions on the contour corner overlap line, determine a collision-avoiding distance of the vehicle;

a generating module, configured to, under a second coordinate system, based on the collision-avoiding distance, generate a path bound for a path planning decision.

Furthermore, the overlap corner position includes at least one primary overlap corner position and two auxiliary overlap corner positions;

the third determining module is specifically configured to, if the primary overlap corner position is same as a vehicle contour corner position of the vehicle, based on the primary overlap corner position, obstacle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the obstacle and the obstacle contour corner positions;

the third determining module is specifically configured to, if the primary overlap corner position is same as an obstacle contour corner position of the obstacle, based on the primary overlap corner position, the vehicle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the vehicle and the vehicle contour corner positions.

Furthermore, the third determining module includes:
a selecting unit, configured to, based on vector directions of the auxiliary overlap corner positions and the primary overlap corner position relative to the trajectory normal, select a target auxiliary overlap corner position;
a constructing unit, configured to, based on the target auxiliary overlap corner position and the primary overlap corner position, construct a reference translation line, and based on a slope of the reference translation line and the vehicle contour corner positions or the obstacle contour corner positions, construct the collision-avoiding translation line;
a determining unit, configured to determine the second intersection position between the collision-avoiding translation line and the decision corner reference line and determine a distance between the second intersection position and the primary overlap corner position as the collision-avoiding distance.

Furthermore, the constructing unit is specifically configured to, based on vector directions of the vehicle contour corner positions or the obstacle contour corner positions and the primary overlap corner position relative to the trajectory normal, select a target vehicle contour corner position or a target obstacle contour corner position, and based on the slope of the reference translation line and the target vehicle contour corner position or the target obstacle contour corner position, construct the collision-avoiding translation line.

Furthermore, the second determining module is specifically configured to, based on two auxiliary overlap corner positions in the overlap corner position, construct the contour corner overlap line, and based on the primary overlap corner position in the overlap corner position and the slope of the trajectory normal, construct the decision corner reference line.

Furthermore, the apparatus further includes:
a fourth determining module, configured to, if the first intersection position between the contour corner overlap line and the decision corner reference line is located on the contour edge, determine a distance between the first intersection position and the primary overlap corner position in the overlap corner position as the collision-avoiding distance.

Furthermore, the generating module is specifically configured to transform the collision-avoiding distance into a collision-avoiding length under the second coordinate system; based on a transverse distance between a target trajectory point in the path trajectory and the vehicle under the second coordinate system, couple the collision-avoiding length with a decision length to obtain the path bound for the path planning decision.

Furthermore, the apparatus further includes:
a transforming module, configured to, under the second coordinate system, obtain the path trajectory of the vehicle in a prediction trajectory frame, and transform the path trajectory to be under the first coordinate system;
a fifth determining module, configured to, under the first coordinate system, based on a vehicle contour of the vehicle, determine vehicle contour point positions of the vehicle at the target trajectory points in the path trajectory;
a first obtaining module, configured to, under the first coordinate system, based on a perception system and/or a path map, obtain at least one obstacle contour point position of the obstacle matching the target trajectory points in the path trajectory.

Furthermore, the fifth determining module is specifically configured to, calculate a heading angle of the target trajectory points in the path trajectory, and based on the heading angle and the vehicle contour, determine the vehicle contour point positions of the vehicle, where the contour point positions include four corner positions of the vehicle.

Furthermore, the apparatus further includes:
a second obtaining module, configured to obtain a central point position of the vehicle and determine a perpendicular direction of the path trajectory;
a constructing module, configured to, based on the perpendicular direction and the central point position, construct the trajectory normal of the vehicle.

According to one aspect of the present invention, there is provided an apparatus for planning a trajectory, including:
the above apparatus for determining a travel path bound, configured to determine a travel path bound of a vehicle; and,
a travel path determining module, configured to, based on travel path bound information obtained by the apparatus for determining a travel path bound, determine a travel trajectory of the vehicle.

According to one aspect of the present invention, there is provided a vehicle, including the above apparatus for determining a travel path bound.

According to one aspect of the present invention, there is provided a vehicle, including the above apparatus for planning a trajectory.

According to another aspect of the present invention, there is provided a storage medium, storing at least one executable instruction, where the executable instruction enables a processor to perform operations corresponding to the above method of determining a path bound for path planning decision.

According to another aspect of the present invention, there is provided a terminal, including a processor, a memory, a communication interface and a communication bus, where the processor, the memory, and the communication interface are in communication with each other via the communication bus.

The memory is configured to store at least one executable instruction, where the executable instruction enables the processor to perform operations corresponding to the above method of determining a path bound for path planning decision.

Based on the above technical solution, the technical solutions of the embodiments of the present invention at least have the following advantages.

In the method and apparatus for determining a travel path bound, the vehicle, the storage medium and the terminal provided by the present invention, compared with the prior arts, according to the embodiments of the present invention, under the first coordinate system, based on contour point positions respectively corresponding to a vehicle and an obstacle in a path trajectory, a collision-anticipated overlap corner position is determined; based on a trajectory normal of the vehicle and the overlap corner position, a contour corner overlap line and a decision corner reference line are determined, where the decision corner reference line is parallel to the trajectory normal, and the contour corner overlap line is covered, in an overlap way, on a collision-anticipated contour edge of the vehicle or the obstacle; if a first intersection position between the contour corner overlap line and the decision corner reference line is not located on the contour edge, based on the overlap corner position, the decision corner reference line and contour corner positions on the contour corner overlap line, a collision-avoiding distance of the vehicle is determined; under a second coordinate system, based on the collision-avoiding distance, a path bound for a path planning decision is generated. In this way, optimization of the planning decision with the path bound as a constraint condition can be achieved, greatly reducing the planning error of the path bound and lowering the risk of colliding with the obstacle in a case of excessively-large turning curvature. Thus, the accuracy of performing path planning decision with the path bound as constraint condition is improved.

The technical solutions of the present invention are briefly described as above. In order to know about the technical means of the present invention more clearly, the present invention can be practiced based on the contents of the specification. Further, in order to help understand other objects, advantages and features of the present invention more easily, the specific embodiments of the present invention are enumerated below.

BRIEF DESCRIPTIONS OF THE DRAWINGS

By reading the detailed descriptions of the following preferred embodiments, various other advantages and benefits become apparent to those skilled in the art. The accompanying drawings are only used to illustrate the preferred embodiments rather than limit the present invention. Furthermore, in all drawings, like reference symbols represent like components.

DETAILED DESCRIPTIONS OF EMBODIMENTS

Figure 1:
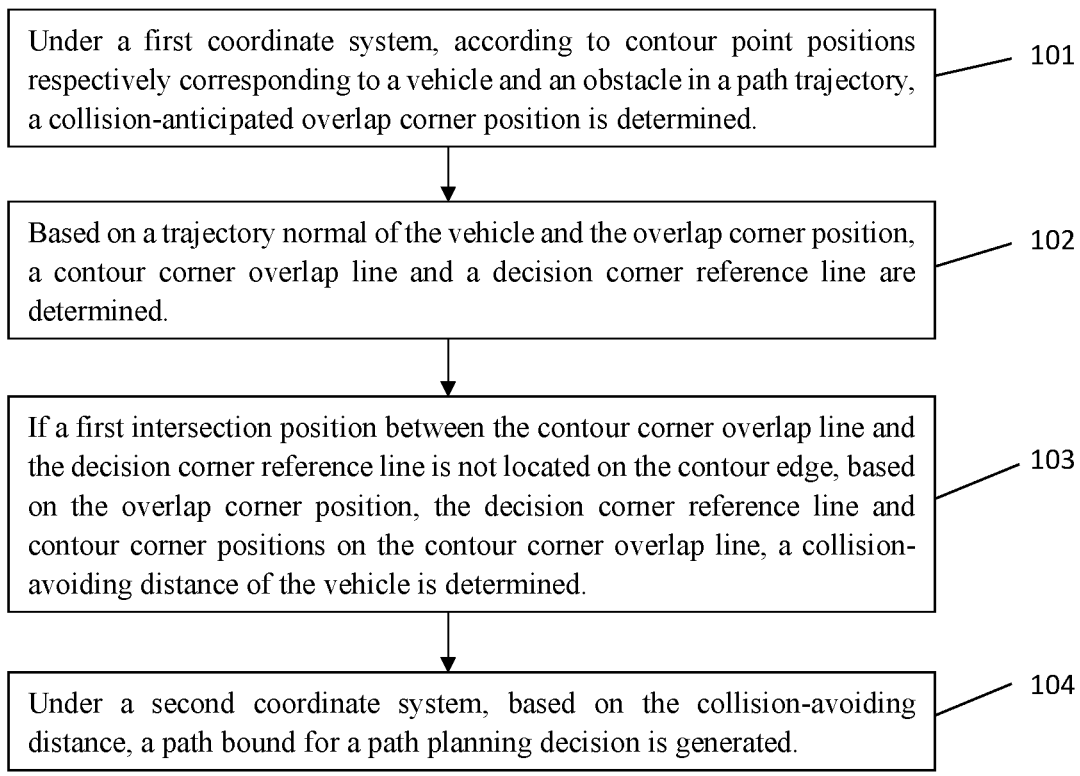
FIG. 1 is a flowchart illustrating a method of determining travel path bound according to an embodiment of the present invention.

The exemplary embodiments of the present invention will be further described with reference to the accompanying drawings. Although the exemplary embodiments of the present invention are shown in the drawings, it should be understood that the present invention can be implemented in various forms and shall not be limited by the embodiments described herein. Conversely, provision of these embodiments is used to more thoroughly understand the present invention and fully convey the scope of the present invention to those skilled in the art.

In a case of an excessively-large turning curvature, there may be too conservative or radical case in setting a path bound based on a vehicle and a center line of an obstacle, leading to inability to satisfy the needs for bound collision avoidance based on vehicle contour, and thus generating a large path bound error. Hence, in a case of an excessively-large turning curvature, there will be a larger risk of colliding with the obstacle, thus resulting in a poor accuracy of performing path planning decision with a path bound as a constraint condition. An embodiment of the present invention provides a method of determining a travel path bound. As shown in FIG. 1, the method includes the following steps.

At step 101, under a first coordinate system, according to contour point positions respectively corresponding to a vehicle and an obstacle in a path trajectory, a collision-anticipated overlap corner position is determined.

Figure 2:
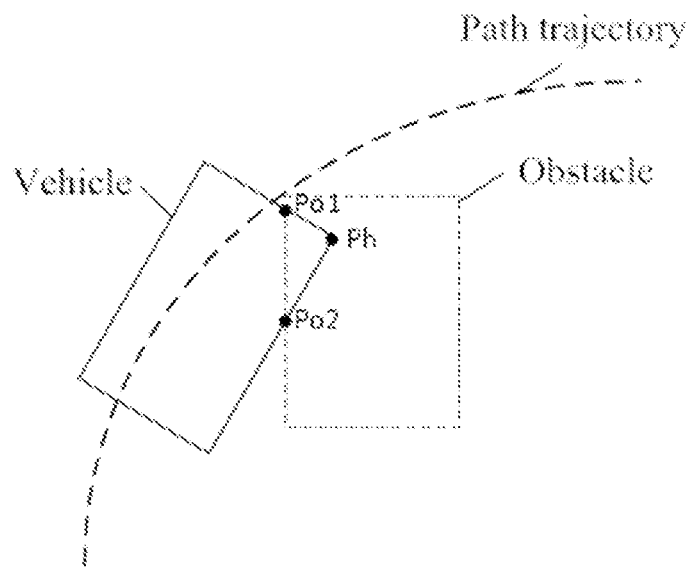
FIG. 2 is a schematic diagram illustrating a collision overlap coverage region according to an embodiment of the present invention.

In one or more embodiments of the present invention, the path trajectory is a trajectory route that a self-driving vehicle is anticipated to travel. The first coordinate system is a coordinate system representing the positions of abscissas and ordinates of the vehicle, preferably, a Cartesian coordinate system. At this time, the path trajectory may be determined based on pre-configured path planning contents, which is not limited herein. At this time, the path trajectory in the path planning is pre-configured, for example, in a scenario of an underground garage, and the path trajectory is a travel route in the underground garage. Therefore, when automatically driven on the path trajectory, the vehicle may determine an obstacle on the path trajectory at the same time, such that a collision-anticipated overlap corner position of the vehicle and the obstacle is determined based on contour point positions respectively corresponding to the vehicle and the obstacle in the path trajectory. The contour point positions of the vehicle are position coordinates of points corresponding to a vehicle contour of the vehicle under the first coordinate system, and the contour point positions of the obstacle are position coordinates of points corresponding to an obstacle contour of the obstacle under the first coordinate system. In this way, collision detection can be performed to determine a collision-anticipated overlap corner position. Specifically, since the collision detection is performed based coordinate positions, when an anticipated collision is determined, the overlap corner position is a position coordinate of each corner in an overlapping part between the contour of the vehicle and the contour of the obstacle under the first coordinate system, that is, collision of the vehicle and the obstacle is represented by contour overlap. As shown in FIG. 2, the overlap corner position includes at least one primary overlap corner position Ph and two auxiliary overlap corner positions Po1 and Po2. At this time, by traversing the contour point positions respectively corresponding to the vehicle and the obstacle, an overlapping scope can be divided, that is, a region is formed by Ph-Po1-Po2. Based on the scope of the overlapping part, an overlapping shape is determined, so as to determine corner positions of the overlapping shape as overlap corner positions.

It is to be noted that the vehicle is a vehicle with an automatic control system in a self-driving scenario, including a passenger vehicle and a commercial vehicle. The common types of the passenger vehicles include but not limited to a sedan, a sport utility vehicle, a multi-person commercial vehicle and the like; the common types of the commercial vehicles include but not limited to a pickup truck, a minibus, a tipper truck, a cargo van, a towing vehicle, a trailer and a mine vehicle and the like. The vehicles can be self-driven based on automatic control system.

At step 102, based on a trajectory normal of the vehicle and the overlap corner position, a contour corner overlap line and a decision corner reference line are determined.

Figure 3:
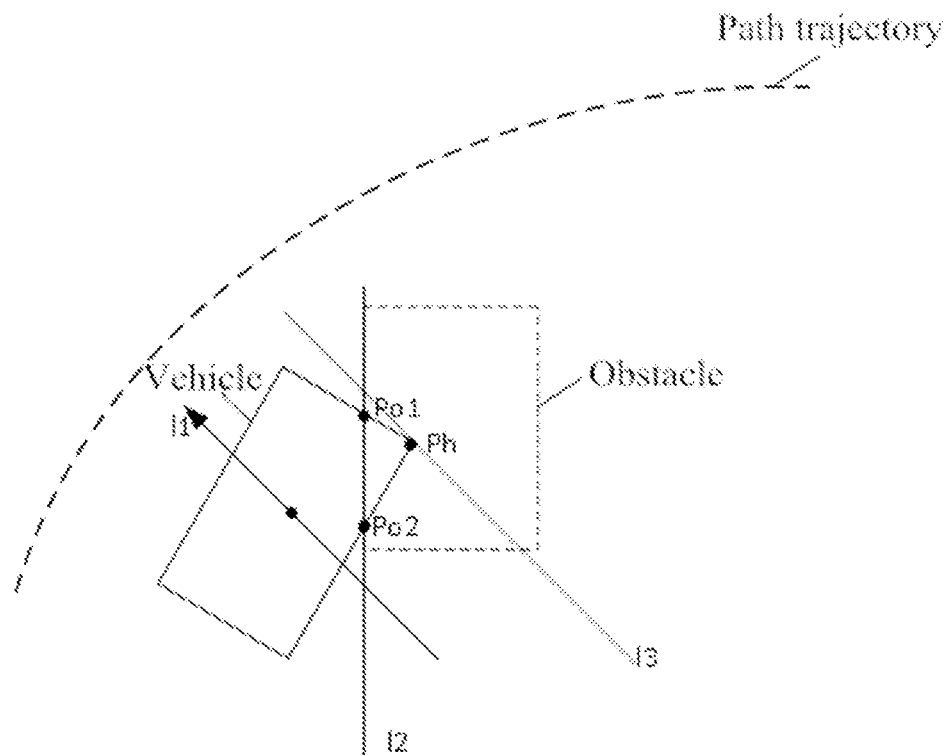
FIG. 3 is a schematic diagram of covering a contour edge of an obstacle covered by a contour corner overlap line according to an embodiment of the present invention.
Figure 4:
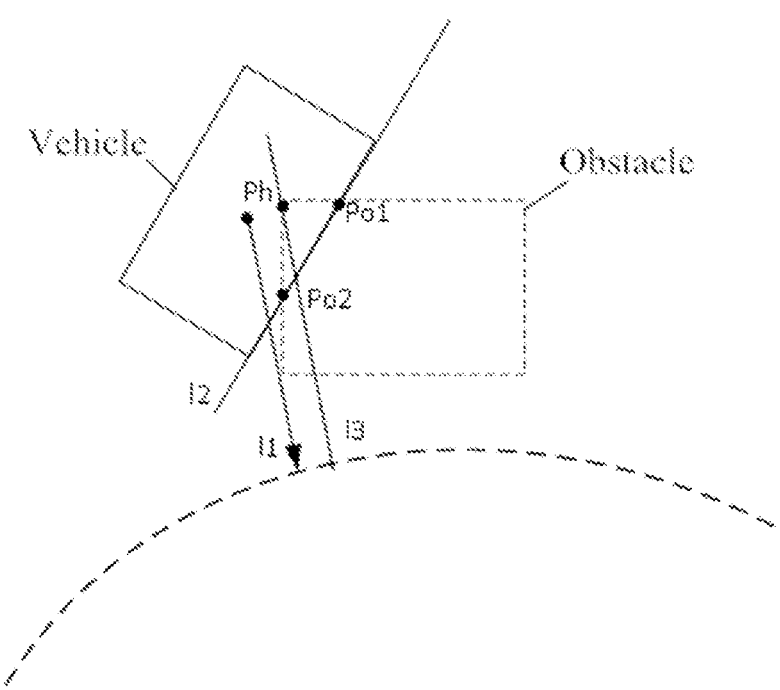
FIG. 4 is a schematic diagram of covering a contour edge of a vehicle by a contour corner overlap line according to an embodiment of the present invention.

In one or more embodiments of the present invention, since the vehicle is self-driven along the path trajectory, a trajectory normal traveled by the vehicle on the path trajectory, i.e. a straight line perpendicular to a tangent line of the path trajectory, can be determined and then combined with the overlap corner position to determine the contour corner overlap line and the decision corner reference line. The contour corner overlap line is covered, in an overlap way, on a collision-anticipated contour edge of the vehicle or the obstacle. The contour edge is one line segment formed with two auxiliary overlap corners used as two endpoints. For different cases, the contour corner overlap line can be covered on a collision-anticipated contour edge Po1-Po2 of the obstacle as shown in FIG. 3, or covered on a collision-anticipated contour edge Po1-Po2 of the vehicle as shown in FIG. 4, where 11 is the trajectory normal, 12 is the contour corner overlap line, and 13 is the decision corner reference line. Further, the determined decision corner reference line is parallel to the trajectory normal. The decision corner reference line is constructed based on the overlap corner position which includes the primary overlap corner position and the auxiliary overlap corner positions. Therefore, in order to make a path bound more accurate, the decision corner reference line is fixed based on the primary overlap corner position to enable the contour corner overlap line to intersect with the decision corner reference line.

It is to be noted that, the construction and determination of each line in the embodiments of the present invention can be performed based on the position coordinate of each point and the straight line formula: $y=kx+b$. For example, based on the coordinate (x, y) of the primary overlap corner position and the slope k of the trajectory normal, the decision corner reference line is constructed. The constructions are not limited in the embodiments of the present invention.

At step 103, if a first intersection position between the contour corner overlap line and the decision corner reference line is not located on the contour edge, based on the overlap corner position, the decision corner reference line and contour corner positions on the contour corner overlap line, a collision-avoiding distance of the vehicle is determined.

In one or more embodiments of the present invention, in combination with a positional relationship between the contour corner overlap line 12 and the decision corner reference line 13 shown in FIGS. 3 and 4, the contour corner overlap line and the decision corner reference line are two unparallel lines, that is, the contour corner overlap line will intersect with the decision corner reference line to form the first intersection position. If the first intersection position is not located on the contour edge, that is, an included angle of the contour corner overlap line and the decision corner reference line is very small and the decision corner reference line and the trajectory normal have a same slope, it indicates that the path trajectory has a large curvature at this time. Thus, based on the overlap corner position, the decision corner reference line and the contour corner positions, the collision-avoiding distance of the vehicle is determined. The contour corner positions are position coordinates of two corners on the contour edge on the contour corner overlap line. If the contour corner overlap line is covered on the contour edge of the vehicle in an overlap way, the contour corner positions are the coordinates of the corner positions on the contour of the vehicle; and if the contour corner overlap line is covered on the contour edge of the obstacle in an overlap way, the contour corner positions are the coordinates of the corner positions on the contour of the obstacle. Specifically, in the embodiments of the present invention, the corners are points of the contour corners, for example, the two contour corner positions Pl1 and Pl2 shown in FIG. 5, which is not specifically limited herein.

It is to be noted that the collision-avoidance distance in the embodiments of the present invention is a distance that the vehicle moves from a current overlapped state to a non-overlapped state under the first coordinate system so as to achieve collision-avoiding travel.

At step 104, under a second coordinate system, based on the collision-avoiding distance, a path bound for a path planning decision is generated.

In the embodiments of the present invention, after the collision-distance is obtained under the first coordinate system, in order to achieve better path planning decision, the collision-avoiding distance is transformed to be under the second coordinate system to generate a path bound, and the path bound is taken as a constraint condition of the path planning decision for optimized solving. Furthermore, the path trajectory is a road anticipated to be traveled. Therefore, in order to determine whether the vehicle has a transverse avoiding space during the path planning decision, the second coordinate system is a coordinate system constructed with a distance along the trajectory and a distance off a centerline of the trajectory, preferably, a Frenet coordinate system. After the collision-avoiding distance is determined, it is transformed to be under the Frenet coordinate system, such that the path bound is generated based on the collision-avoiding distance under the coordinate system. At this time, the path bound can be used for the path planning decision to improve the accuracy of the path planning.

In another embodiment of the present invention, in order to make further limitation and descriptions, the step of, based on the overlap corner position, the decision corner reference line and the contour corner positions on the contour corner overlap line, determining the collision-avoiding distance of the vehicle includes:

if the primary overlap corner position is same as a vehicle contour corner position of the vehicle, based on the primary overlap corner position, obstacle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the obstacle and the obstacle contour corner positions;

if the primary overlap corner position is same as an obstacle contour corner position of the obstacle, based on the primary overlap corner position, the vehicle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, where the contour corner overlap line is covered, in an overlap way, on a collision-anticipated contour edge of the vehicle and the vehicle contour corner positions.

In order to accurately determine the collision-avoiding distance of the vehicle, for different anticipated collisions, the contour edge of the vehicle or obstacle that the constructed contour corner overlap line covers in an overlap way is different. Specifically, as shown in FIG. 3, when the vehicle and the obstacle are anticipated to collide, if the primary overlap corner position is same as one contour corner position of the vehicle in an overlap collision region, it indicates that the vehicle enters the obstacle and collides with the obstacle. At this time, the constructed contour corner overlap line is covered on the collision-anticipated contour edge of the obstacle in an overlap way, and the contour corner overlap line is also covered on the obstacle contour corner positions in an overlap way, as shown by 12 in FIG. 3. As shown in FIG. 4, when the vehicle and the obstacle are anticipated to collide, if the primary overlap corner position is same as one contour corner position of the obstacle in an overlap collision region, it indicates that the obstacle enters the vehicle and collides with the vehicle. At this time, the constructed contour corner overlap line is covered on the collision-anticipated contour edge of the vehicle in an overlap way, and the contour corner overlap line is also covered on the vehicle contour corner positions in an overlap way, as shown by 12 in FIG. 4.

It is to be noted that, when different anticipated collisions are detected, the contour corner overlap line covered on the contour edge of the vehicle or the obstacle in an overlap way is different. A collision-avoiding translation line may be constructed based on the primary overlap corner position, the vehicle contour corner positions or the obstacle contour corner positions and the auxiliary overlap corner positions, where the collision-avoiding translation line is used to represent a maximum reference line with which the vehicle performs collision-avoiding movement relative to the obstacle as shown by 15 in FIG. 6. In order to enable the vehicle to move along the trajectory normal of the vehicle during a collision-avoiding movement, a straight-line distance between the second intersection position between the collision-avoiding translation line and the decision corner reference line and the primary overlap corner position is determined as the collision-avoiding distance, such that the vehicle can avoid colliding with the obstacle after trajectory optimization is performed with the collision-avoiding distance as a constraint condition.

Figure 7:
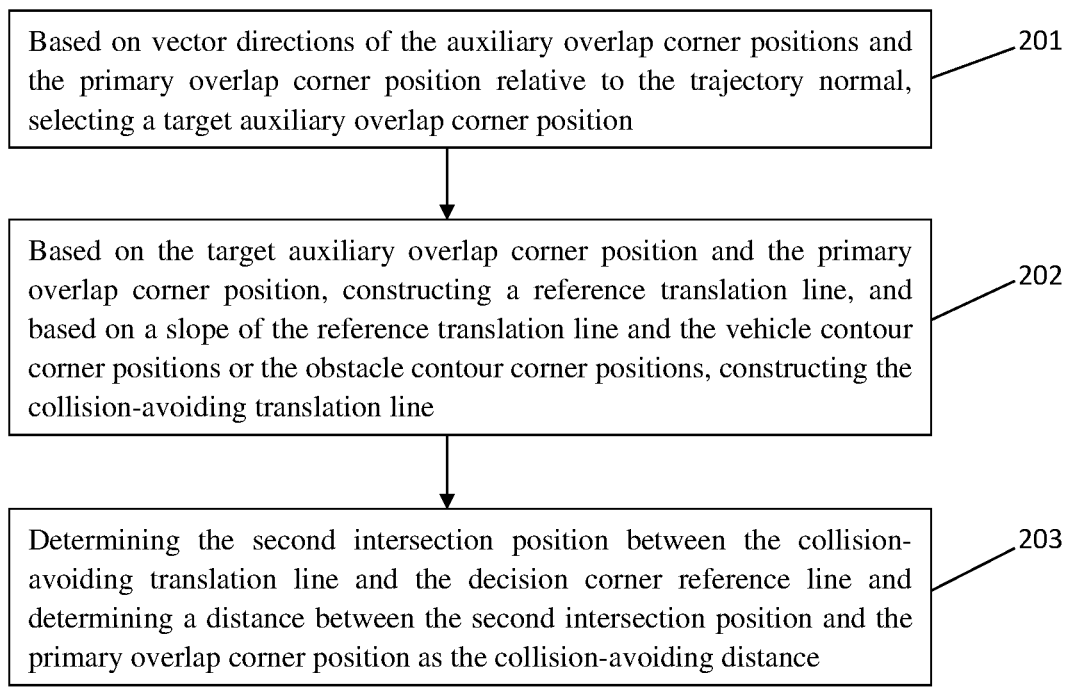
FIG. 7 is a flowchart illustrating another method of determining a travel path bound according to an embodiment of the present invention.

In another embodiment of the present invention, in order to make further limitation and descriptions, as shown in FIG. 7, the step of, based on the primary overlap corner position, the vehicle contour corner positions or the obstacle contour corner positions, and the auxiliary overlap corner positions, constructing the collision-avoiding translation line, and based on the primary overlap corner position and the second intersection position between the collision-avoiding translation line and the decision corner reference line, determining the collision-avoiding distance of the vehicle includes:

at step 201, based on vector directions of the auxiliary overlap corner positions and the primary overlap corner position relative to the trajectory normal, selecting a target auxiliary overlap corner position;

at step 202, based on the target auxiliary overlap corner position and the primary overlap corner position, constructing a reference translation line, and based on a slope of the reference translation line and the vehicle contour corner positions or the obstacle contour corner positions, constructing the collision-avoiding translation line; and at step 203, determining the second intersection position between the collision-avoiding translation line and the decision corner reference line and determining a distance between the second intersection position and the primary overlap corner position as the collision-avoiding distance.

Figure 6:
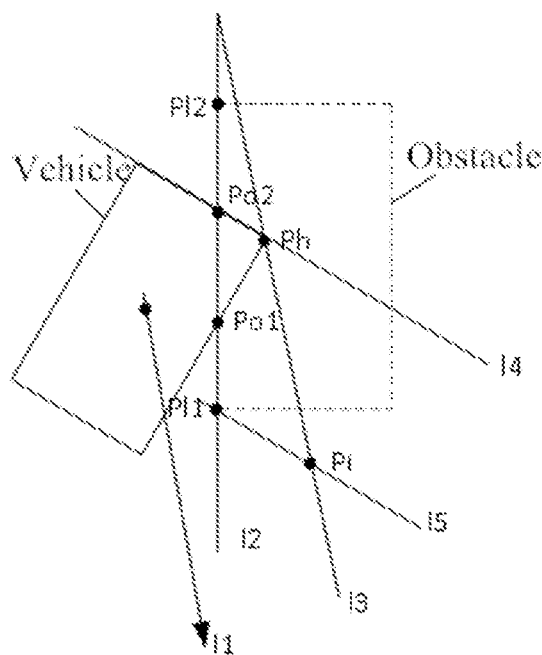
FIG. 6 is a schematic diagram of determining a collision-avoiding distance according to an embodiment of the present invention.

In an embodiment of the present invention, the auxiliary overlap corner positions include the position coordinates of two overlap corners. In order to construct the reference translation line based on one target auxiliary overlap corner position and the primary overlap corner position to obtain the collision-avoiding translation line, based on the vector directions of the auxiliary overlap corner positions and the primary overlap corner position relative to the trajectory normal, one target auxiliary overlap corner position is determined. The vector directions of the two auxiliary overlap corner positions and the primary overlap corner position are determined. If the vector directions of one auxiliary overlap corner Po1 and the primary overlap corner position Ph relative to the trajectory normal are forward directions, the other auxiliary overlap corner Po2 is selected as a target auxiliary overlap corner, that is, the position of the Po2 is selected as the target auxiliary overlap corner position as shown in FIG. 6. Based on the target auxiliary overlap corner position Po2 and the primary overlap corner position Ph, the reference translation line is constructed. After the reference translation line 14 is constructed, the collision-avoiding translation line is constructed based on a slope of the reference translation line 14 and the contour corner positions of the vehicle or the obstacle. Further, if the vector directions of one auxiliary overlap corner Po1 and the primary overlap corner position Ph relative to the trajectory normal are backward directions, the collision-avoiding translation line can be constructed reversely, which is not redundantly described herein.

In a specific example scenario, if the primary overlap corner position Ph (Phx, Phy) is same as a vehicle contour corner position as shown in FIG. 6, the auxiliary overlap corner positions are Po1 (Po1x, Po1y) and Po2 (Po2x, Po2y)

respectively. At this time, the vector directions of the Po1 and Ph relative to the trajectory normal, Proj1=Proj(<Ph, Po1>, 13), are forward directions, and thus the reference translation line 14 is constructed by selecting the target auxiliary overlap corner position Po2 and the primary overlap corner position Ph. At this time, 13 has the same direction as the trajectory normal. Then, based on the slope of the reference translation line 14 and one of the obstacle contour corner positions Pl1 (Pl1x, Pl1y) and Pl2 (Pl2x, Pl2y), the collision-avoiding translation line is constructed, and preferably, based on the slope of the reference translation line 14 and the obstacle contour corner position Pl1, the collision-avoiding translation line 15 is constructed, where k_14= (Po2y−Phy)/(Po2x−Phx), i.e. 15: y=k_14*(x−Pl1x)+Pl1y.

Figure 8:
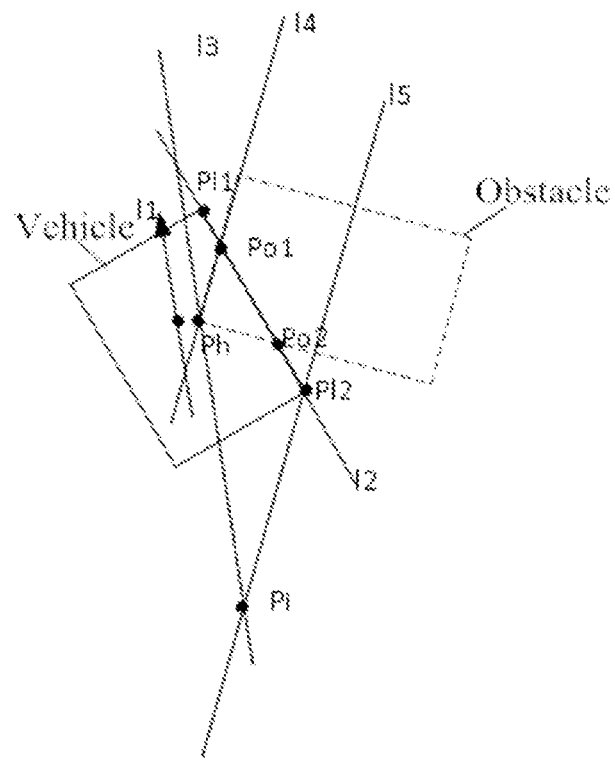
FIG. 8 is another schematic diagram of determining a collision-avoiding distance according to an embodiment of the present invention.

In a specific example scenario, if the primary overlap corner position Ph (Phx, Phy) is same as an obstacle contour corner position as shown in FIG. 8, the auxiliary overlap corner positions are Po1 (Po1x, Po1y) and Po2 (Po2x, Po2y) respectively. At this time, the vector directions of the Po1 and Ph relative to the trajectory normal, Proj1=Proj(<Ph, Po1>, 13), are forward directions, and thus the reference translation line 14 is constructed by selecting the target auxiliary overlap corner position Po1 and the primary overlap corner position Ph. At this time, 13 has the same direction as the trajectory normal. Then, based on the slope of the reference translation line 14 and one of the vehicle contour corner positions Pl1 (Pl1x, Pl1y) and Pl2 (Pl2x, Pl2y), the collision-avoiding translation line is constructed, and preferably, based on the slope of the reference translation line 14 and the vehicle contour corner position Pl2, the collision-avoiding translation line 15 is constructed, i.e. 15: y=k_14* (x−Pl2x)+Pl2y.

It is to be noted that, as shown in FIGS. 6 and 8, the collision-avoiding translation line 15 intersects with the trajectory normal 13 at one second intersection position, i.e., Pi(Pix, Piy). In order to enable the vehicle to fully avoid collision with the obstacle during path planning, a distance between the second intersection position Pi and the primary overlap corner position Ph is determined as the collision-avoiding distance, that is, adjust_distance=‖<Pi, Ph>‖.

In another embodiment of the present invention, in order to make further limitation and descriptions, the step of, based on the slope of the reference translation line and the vehicle contour corner positions or the obstacle contour corner positions, constructing the collision-avoiding translation line includes:

based on vector directions of the vehicle contour corner positions or the obstacle contour corner positions and the primary overlap corner position relative to the trajectory normal, selecting a target vehicle contour corner position or a target obstacle contour corner position, and based on the slope of the reference translation line and the target vehicle contour corner position or the target obstacle contour corner position, constructing the collision-avoiding translation line.

Since the contour corner overlap line covers the vehicle contour corner positions or the obstacle contour corner positions, the vehicle contour corner positions or the obstacle contour corner positions include position coordinates of two contour corners, for example, Pl1 and Pl2. In order to accurately construct the collision-avoiding translation line, during such construction process, based on the vector directions of the vehicle contour corner positions or the obstacle contour corner positions and the primary overlap corner position relative to the trajectory normal, a target vehicle contour corner position or a target obstacle contour corner position is selected such that the collision-avoiding translation line is constructed based on the slope of the reference translation line and the target vehicle contour corner position or the target obstacle contour corner position.

In an example scenario where the primary overlap corner position Ph (Phx, Phy) is same as a vehicle contour corner position of the vehicle as shown in FIG. 6, the obstacle contour corner positions are Pl1 and Pl2. If the vector directions of the Pl1 and the Ph relative to the trajectory normal, Proj1'=Proj(<Ph, Pl1>, 13), are forward directions, the target obstacle contour corner position Pl1 is selected and based on the slope of the reference translation line 14 and the target obstacle contour corner position Pl1, the collision-avoiding translation line 15 is constructed, where, 15: y=k_14*(x−Pl1x)+Pl1y.

Likewise, in an example scenario where the primary overlap corner position Ph (Phx, Phy) is same as an obstacle contour corner position of the obstacle as shown in FIG. 8, the vehicle contour corner positions are Pl1 and Pl2. If the vector directions of the Pl1 and the Ph relative to the trajectory normal, Proj1'=Proj(<Ph, Pl1>, 13), are forward directions, the target vehicle contour corner position Pl2 is selected and based on the slope of the reference translation line 14 and the target vehicle contour corner position Pl2, the collision-avoiding translation line 15 is constructed, where 15: y=k_14*(x−Pl2x)+Pl2y.

In another embodiment of the present invention, in order to make further limitation and descriptions, the step of, based on the trajectory normal of the vehicle and the overlap corner position, determining the contour corner overlap line and the decision corner reference line includes:

based on two auxiliary overlap corner positions in the overlap corner position, constructing the contour corner overlap line, and based on the primary overlap corner position in the overlap corner position and the slope of the trajectory normal, constructing the decision corner reference line.

The vehicle is self-driven along the path trajectory and the overlap corner position includes the primary overlap corner position and the auxiliary overlap corner positions. In order to accurately construct the contour corner overlap line and the decision corner reference line shown in FIGS. 3 and 4, based on two auxiliary overlap corner positions in the overlap corner position, the contour corner overlap line is constructed, for example, l2: y2=k2x+b2, where it can be calculated in combination with the two auxiliary overlap corner positions Po1(Po1x, Po1y), Po1(Po2x, Po2y); at the same time, based on the primary overlap corner position Ph(Phx, Phy) in the overlap corner position and the slope k1 of the trajectory normal, the decision corner reference line l3 is constructed, where l3: y3=k1(x−Phx)+Phy. Furthermore, the trajectory normal l1 can be represented by l1: y1=k1x+ b1, which is not limited in the embodiments of the present invention.

In another embodiment of the present invention, in order to make further limitation and descriptions, after, based on the trajectory normal of the vehicle and the overlap corner position, determining the contour corner overlap line and the decision corner reference line, the method further includes:

if the first intersection position between the contour corner overlap line and the decision corner reference line is located on the contour edge, determining a distance between the first intersection position and the primary overlap corner position in the overlap corner position as the collision-avoiding distance.

Figure 5:
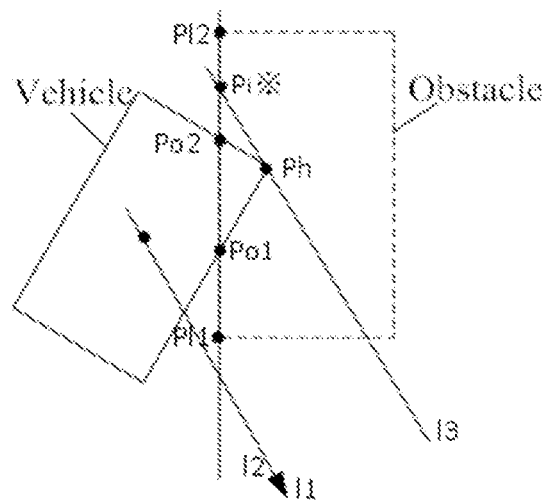
FIG. 5 is a schematic diagram of an auxiliary overlap corner position and a contour corner position according to an embodiment of the present invention.

In an embodiment of the present invention, in combination with a positional relationship between the contour corner overlap line l2 and the decision corner reference line 13, it is determined that the contour corner overlap line and the decision corner reference line are two unparallel lines, that is, the contour corner overlap line will intersect with the decision corner reference line to form the first intersection position. If the first intersection position is located on the contour edge, that is, an included angle of the contour corner overlap line and the decision corner reference line is very large and the decision corner reference line and the trajectory normal have a same slope, it indicates that the path trajectory has a small curvature at this time. Thus, the distance between the first intersection position and the primary overlap corner position in the overlap corner position may be determined as the collision-avoiding distance. As shown in FIG. 5, the first intersection position Pi'(Pi'x, Pi'y) of l1 and l3 is located on the contour edge of the obstacle, and the distance between the first intersection position Pi' and the primary overlap corner position Ph(Phx, Phy) is calculated as the collision-avoiding distance, that is, adjust_distance=‖<Pi', Ph>‖.

In another embodiment of the present invention, in order to make further limitation and descriptions, the step of, under the second coordinate system, based on the collision-avoiding distance, generating the path bound for the path planning decision includes:

transforming the collision-avoiding distance into a collision-avoiding length under the second coordinate system;

based on a transverse distance between a target trajectory point in the path trajectory and the vehicle under the second coordinate system, coupling the collision-avoiding length with a decision length to obtain the path bound for the path planning decision.

In order to perform path planning decision with the path bound as a constraint condition to improve the accuracy of the path planning decision, the path bound is generated based on the collision-avoiding distance under the second coordinate system. Specifically, firstly, the collision-avoiding distance obtained under the first coordinate system is transformed to be under the second coordinate system, for example, adjust_daistance obtained under a Cartesian coordinate system is transformed to be under a Frenet coordinate system, so as to obtain adjusted_daistance. Based on the transverse distance between the target trajectory point and the vehicle under the second coordinate system, the collision-avoiding length is coupled with the decision length to obtain the path bound. The target trajectory point is a trajectory point on the path trajectory. One trajectory frame may include 20 trajectory points within 0-4 s. If the current trajectory point is i, positions of i+1 trajectory points under the Frenet coordinate system are determined during a path planning decision, so as to determine the transverse distance between each target trajectory point and the vehicle. At this time, the transverse distance can be determined with a central point of the vehicle as a reference position to perform transverse constraining for the vehicle relative to the path trajectory, which is not limited in the embodiments of the present invention. Furthermore, after the transverse distance l between the target trajectory point and the vehicle is determined, the transverse distance is compared with the length of the obstacle and then the collision-avoiding length is coupled with the decision length based on a comparison result to obtain the path bound as constraint condition. Specifically, if the transverse distance of the (i+1)-th point is less than the length of the obstacle, path.upper_bound=traj(i).l-adjusted_distance; if the transverse distance of the (i+1)-th point is greater than the length of the obstacle, path.lower_bound=traj(i).l+adjusted_distance; where traj(i)l represents a decision length corresponding to the i-th point. Thus, in different cases, the decision length can be coupled with the collision-avoiding distance adjusted_distance to obtain the path bound. Further, path.upper_bound and path.lower_bound are an upper bound and a lower bound for performing path planning for a next trajectory point with the path bound as constraint condition.

Figure 9:
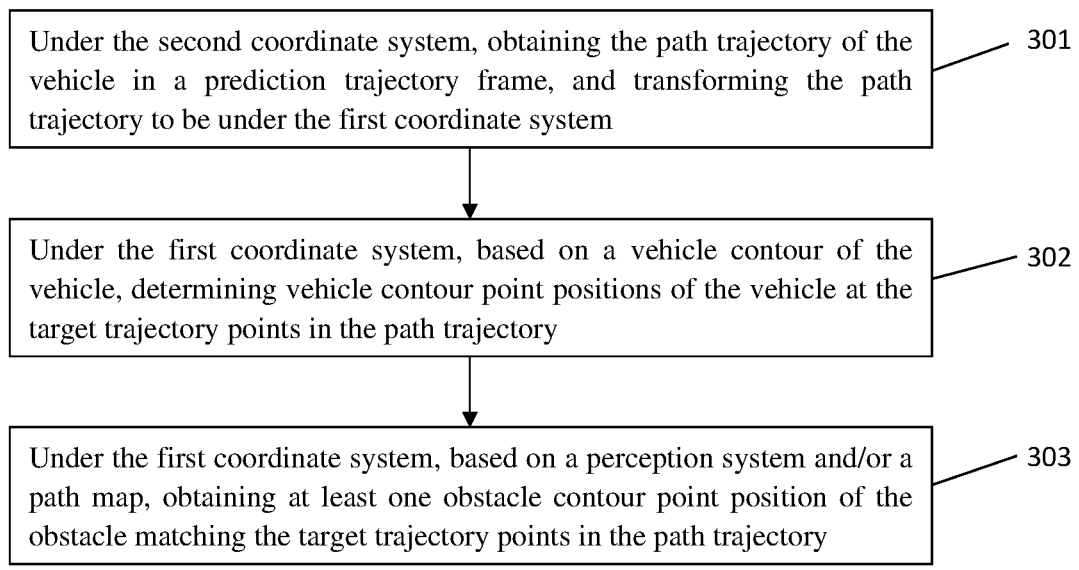
FIG. 9 is a flowchart illustrating another method of determining a travel path bound according to an embodiment of the present invention.

In another embodiment of the present invention, in order to make further limitation and descriptions, as shown in FIG. 9, before, under the first coordinate system, according to the contour point positions respectively corresponding to the vehicle and the obstacle in the path trajectory, determining the collision-anticipated overlap corner position, the method further includes:

at step 301: under the second coordinate system, obtaining the path trajectory of the vehicle in a prediction trajectory frame, and transforming the path trajectory to be under the first coordinate system;

at step 302, under the first coordinate system, based on a vehicle contour of the vehicle, determining vehicle contour point positions of the vehicle at the target trajectory points in the path trajectory;

at step 303, under the first coordinate system, based on a perception system and/or a path map, obtaining at least one obstacle contour point position of the obstacle matching the target trajectory points in the path trajectory.

In order to determine a path bound under the first coordinate system to improve optimization accuracy of the path bound, the path trajectory of the vehicle in the prediction trajectory frame is firstly obtained under the second coordinate system and then transformed to be under the first coordinate system. The prediction trajectory frame may include all path trajectory points corresponding to a current moment and subsequent four seconds, preferably, 20 path trajectory points, so as to form one path trajectory. In an embodiment of the present invention, a vehicle model can be obtained based on an application program std: <trajectorypoints>traj to determine a path trajectory of a vehicle, which is then transformed to be under the first coordinate system. Further, in combination with an obstacle decider, under the first coordinate system, the vehicle contour point positions corresponding to the target trajectory points in the path trajectory are determined based on the vehicle contour of the vehicle including vehicle length and width, such that the vehicle contour point positions of the vehicle under the first coordinate system are determined based on the vehicle contour. At this time, the vehicle contour point positions include a plurality of vehicle contour edge point positions and four vehicle contour corner positions, which is not limited in the embodiments of the present invention.

It is to be noted that, since the prediction trajectory frame in the embodiments of the present invention may include 20 target trajectory points, collision detection is performed for the vehicle at the points. Hence, under the first coordinate system, based on a perception system and/or a path map, at least one obstacle contour point position of the obstacle matching the target trajectory points in the path trajectory is obtained and thus, based on the obstacle contour point positions, whether the vehicle collides with the obstacle is determined. The obstacle contour point positions include a plurality of obstacle contour edge point position and four obstacle contour corner positions, which is not limited in the embodiments of the present invention. Further, under the first coordinate system, collision detection between the obstacle and the vehicle is performed, and the detection may also be performed by using a HasOverlap function having a function of covering a regional computation, that is, under the first coordinate system, based on the obstacle contour point positions and the vehicle contour point positions, whether an overlap coverage region is present is calculated to complete the collision detection. If collision is anticipated to occur to each target trajectory point, the overlap corner position corresponding to each target trajectory point is calculated to perform the method of steps 101 to 104 in the embodiments of the present invention.

In another embodiment of the present invention, in order to make further limitation and descriptions, the step of, based on the vehicle contour of the vehicle, determining the vehicle contour point positions of the vehicle at the target trajectory points in the path trajectory includes:

calculating a heading angle of the target trajectory points in the path trajectory, and based on the heading angle and the vehicle contour, determining the vehicle contour point positions of the vehicle.

During a vehicle travel process, a central point of the vehicle is controlled to run along the path trajectory, that is, the position of the vehicle changes in real time during the travel process. In order to accurately determine the vehicle contour point positions, when the vehicle contour point positions are determined based on the vehicle contour under the first coordinate system, the heading angle of each target trajectory point is determined firstly and then based on the heading angle and the vehicle contour (including vehicle length and width), the vehicle contour point positions of the vehicle are mapped under the first coordinate system. The vehicle contour point positions include a plurality of vehicle contour edge point positions and four vehicle contour corner positions. The heading angle is a tangent direction based on the path trajectory, i.e. heading angle: a tan $2(x\_\{i\}-x\_\{i-1\}, y\_\{i\}-y\_\{i-1\})$, i=1, ... n, n=20.

In another embodiment of the present invention, in order to make further limitation and descriptions, before, based on the trajectory normal of the vehicle and the overlap corner position, determining the contour corner overlap line and the decision corner reference line, the method further includes:

obtaining a central point position of the vehicle and determining a perpendicular direction of the path trajectory;

based on the perpendicular direction and the central point position, constructing the trajectory normal of the vehicle.

In an embodiment of the present invention, the central point of the vehicle is driven to run automatically along the path trajectory. In order to enable the vehicle to be planned based on the transverse distance from the path during a collision-avoiding process, a trajectory normal is pre-constructed. Specifically, firstly, the central point position corresponding to the moment of each target trajectory point is obtained, and geometric calculation can be performed based on the vehicle contour under the first coordinate system, which is not limited in the embodiments of the present invention. Further, since the heading angle is a tangent direction of the path trajectory, a perpendicular direction may be obtained as the direction of the trajectory normal by making a perpendicular line based on the tangent direction of the path trajectory. Thus, the trajectory normal can be constructed across the central point position based on the perpendicular direction. As shown by 11 in FIGS. 3 and 4, the direction of the trajectory normal faces toward the path trajectory such that the vector directions corresponding to projection Proj1 and projection Proj1' are determined.

In the method of determining a travel path bound according to the embodiments of the present invention, under the first coordinate system, based on contour point positions respectively corresponding to the vehicle and the obstacle in the path trajectory, a collision-anticipated overlap corner position is determined; based on the trajectory normal of the vehicle and the overlap corner positions, the contour corner overlap line and the decision corner reference line are determined, where the decision corner reference line is parallel to the trajectory normal, and the contour corner overlap line is covered, in an overlap way, on a collision-anticipated contour edge of the vehicle or the obstacle; if a first intersection position between the contour corner overlap line and the decision corner reference line is not located on the contour edge, based on the overlap corner position, the decision corner reference line and contour corner positions on the contour corner overlap line, a collision-avoiding distance of the vehicle is determined; under the second coordinate system, based on the collision-avoiding distance, a path bound for a path planning decision is generated. In this way, optimization of the planning decision with the path bound as a constraint condition can be achieved, greatly reducing the planning error of the path bound and lowering the risk of colliding with the obstacle in a case of excessively-large turning curvature. Thus, the accuracy of performing path planning decision with the path bound as constraint condition is improved.

An embodiment of the present invention provides a method of planning a trajectory, including:

according to the method of steps 101 to 104, determining a travel path bound of a vehicle;

according to the travel path bound, determining a travel trajectory of the vehicle.

In the embodiments of the present invention, the travel path bound of the vehicle is determined by the steps 101 to 104, and path planning decision is performed with the travel path bound as a constraint condition to obtain a travel trajectory that the vehicle is anticipated to travel, thereby improving the planning accuracy and effectiveness of the travel path, and lowering the risk of colliding with the obstacle in a case of excessively-large turning curvature.

Figure 10:
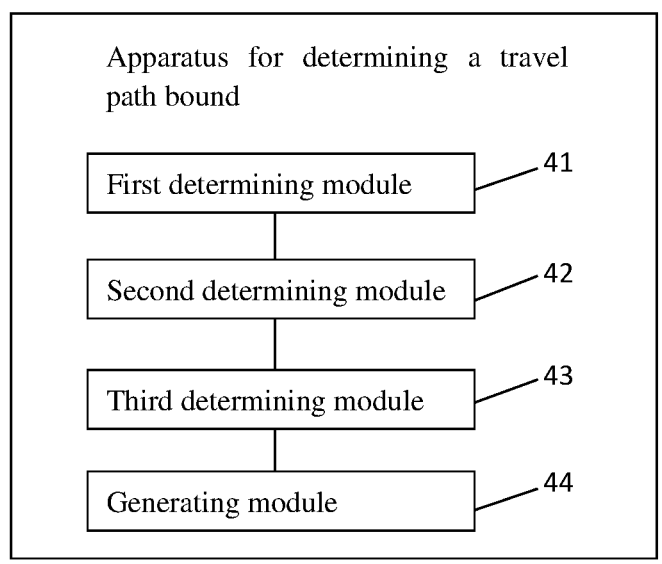
FIG. 10 is a block diagram illustrating an apparatus for determining a travel path bound according to an embodiment of the present invention.

Furthermore, as an implementation for the method shown in FIG. 1, an embodiment of the present invention provides an apparatus for determining a travel path bound. As shown in FIG. 10, the apparatus includes:

a first determining module 41, configured to, under a first coordinate system, according to contour point positions respectively corresponding to a vehicle and an obstacle in a path trajectory, determine a collision-anticipated overlap corner position;

a second determining module 42, configured to, based on a trajectory normal of the vehicle and the overlap corner position, determine a contour corner overlap line and a decision corner reference line, where the decision corner reference line is parallel to the trajectory normal, and the contour corner overlap line is covered, in an overlap way, on a collision-anticipated contour edge of the vehicle or the obstacle;

a third determining module 43, configured to, if a first intersection position between the contour corner overlap line and the decision corner reference line is not located on the contour edge, based on the overlap corner position, the decision corner reference line and contour corner positions on the contour corner overlap line, determine a collision-avoiding distance of the vehicle;

a generating module 44, configured to, under a second coordinate system, based on the collision-avoiding distance, generate a path bound for a path planning decision.

Furthermore, the overlap corner position includes at least one primary overlap corner position and two auxiliary overlap corner positions.

The third determining module is specifically configured to, if the primary overlap corner position is same as a vehicle contour corner position of the vehicle, based on the primary overlap corner position, obstacle contour corner positions, and the auxiliary overlap corner positions, construct a collision-avoiding translation line, and based on the primary overlap corner position and a second intersection position between the collision-avoiding translation line and the decision corner reference line, determine the collision-avoiding distance of the vehicle, where the contour corner overlap line is covered, in an overlap way, on a collision-anticipated contour edge of the obstacle and the obstacle contour corner positions.

The third determining module is specifically configured to, if the primary overlap corner position is same as an obstacle contour corner position of the obstacle, based on the primary overlap corner position, the vehicle contour corner positions, and the auxiliary overlap corner positions, construct a collision-avoiding translation line, and based on the primary overlap corner position and a second intersection position between the collision-avoiding translation line and the decision corner reference line, determine the collision-avoiding distance of the vehicle, where the contour corner overlap line is covered, in an overlap way, on a collision-anticipated contour edge of the vehicle and the vehicle contour corner positions.

Furthermore, the third determining module includes:
 a selecting unit, configured to, based on vector directions of the auxiliary overlap corner positions and the primary overlap corner position relative to the trajectory normal, select a target auxiliary overlap corner position;
 a constructing unit, configured to, based on the target auxiliary overlap corner position and the primary overlap corner position, construct a reference translation line, and based on a slope of the reference translation line and the vehicle contour corner positions or the obstacle contour corner positions, construct the collision-avoiding translation line;
 a determining unit, configured to determine the second intersection position between the collision-avoiding translation line and the decision corner reference line and determine a distance between the second intersection position and the primary overlap corner position as the collision-avoiding distance.

Furthermore, the constructing unit is specifically configured to, based on vector directions of the vehicle contour corner positions or the obstacle contour corner positions and the primary overlap corner position relative to the trajectory normal, select a target vehicle contour corner position or a target obstacle contour corner position, and based on the slope of the reference translation line and the target vehicle contour corner position or the target obstacle contour corner position, construct the collision-avoiding translation line.

Furthermore, the second determining module is specifically configured to, based on two auxiliary overlap corner positions in the overlap corner position, construct the contour corner overlap line, and based on the primary overlap corner position in the overlap corner position and the slope of the trajectory normal, construct the decision corner reference line.

Furthermore, the apparatus further includes:
 a fourth determining module, configured to, if the first intersection position between the contour corner overlap line and the decision corner reference line is located on the contour edge, determine a distance between the first intersection position and the primary overlap corner position in the overlap corner position as the collision-avoiding distance.

Furthermore, the generating module is specifically configured to: transform the collision-avoiding distance into a collision-avoiding length under the second coordinate system; based on a transverse distance between a target trajectory point in the path trajectory and the vehicle under the second coordinate system, couple the collision-avoiding length with a decision length to obtain the path bound for the path planning decision.

Furthermore, the apparatus further includes:
 a transforming module, configured to, under the second coordinate system, obtain the path trajectory of the vehicle in a prediction trajectory frame, and transform the path trajectory to be under the first coordinate system;
 a fifth determining module, configured to, under the first coordinate system, based on a vehicle contour of the vehicle, determine vehicle contour point positions of the vehicle at the target trajectory points in the path trajectory;
 a first obtaining module, configured to, under the first coordinate system, based on a perception system and/or a path map, obtain at least one obstacle contour point position of the obstacle matching the target trajectory points in the path trajectory.

Furthermore, the fifth determining module is specifically configured to, calculate a heading angle of the target trajectory points in the path trajectory; and based on the heading angle and the vehicle contour, determine the vehicle contour point positions of the vehicle, where the contour point positions include four corner positions of the vehicle.

Furthermore, the apparatus further includes:
 a second obtaining module, configured to obtain a central point position of the vehicle and determining a perpendicular direction of the path trajectory;
 a constructing module, configured to, based on the perpendicular direction and the central point position, construct the trajectory normal of the vehicle.

In the apparatus for determining a travel path bound according to the embodiments of the present invention, under the first coordinate system, based on contour point positions respectively corresponding to the vehicle and the obstacle in the path trajectory, a collision-anticipated overlap corner position is determined; based on the trajectory normal of the vehicle and the overlap corner positions, the contour corner overlap line and the decision corner reference line are determined, where the decision corner reference line is parallel to the trajectory normal, and the contour corner overlap line is covered, in an overlap way, on a collision-anticipated contour edge of the vehicle or the obstacle; if a first intersection position between the contour corner overlap line and the decision corner reference line is not located on the contour edge, based on the overlap corner position, the decision corner reference line and contour corner positions on the contour corner overlap line, a collision-avoiding distance of the vehicle is determined; under the second coordinate system, based on the collision-avoiding distance, a path bound for a path planning decision is generated. In this way, optimization of the planning decision with the path bound as a constraint condition can be achieved, greatly reducing the planning error of the path bound and lowering the risk of colliding with the obstacle in a case of excessively-large turning curvature. Thus, the accuracy of performing path planning decision with the path bound as constraint condition is improved.

Furthermore, as an implementation for the above method, an embodiment of the present invention provides an apparatus for planning a trajectory, including:

the apparatus for determining a travel path bound, configured to determine a travel path bound of a vehicle; and, a travel path determining module, configured to, based on travel path bound information obtained by the apparatus for determining a travel path bound, determine a travel trajectory of the vehicle.

In the embodiments of the present invention, the travel path bound is determined by using the apparatus for determining a travel path bound, and path planning decision is performed with the travel path bound as a constraint condition to obtain a travel trajectory that the vehicle is anticipated to travel, thereby improving the planning accuracy and effectiveness of the travel path, and lowering the risk of colliding with the obstacle in a case of excessively-large turning curvature.

Furthermore, as an implementation for the above method, an embodiment of the present invention provides a vehicle, including the above apparatus for determining a travel path bound.

Furthermore, as an implementation for the above method, an embodiment of the present invention provides another vehicle, including the above apparatus for planning a trajectory.

According to an embodiment of the present invention, there is provided a storage medium, storing at least one executable instruction, where the executable instruction is executed to perform the method of determining a travel path bound in any one of the above method embodiments.

Figure 11:
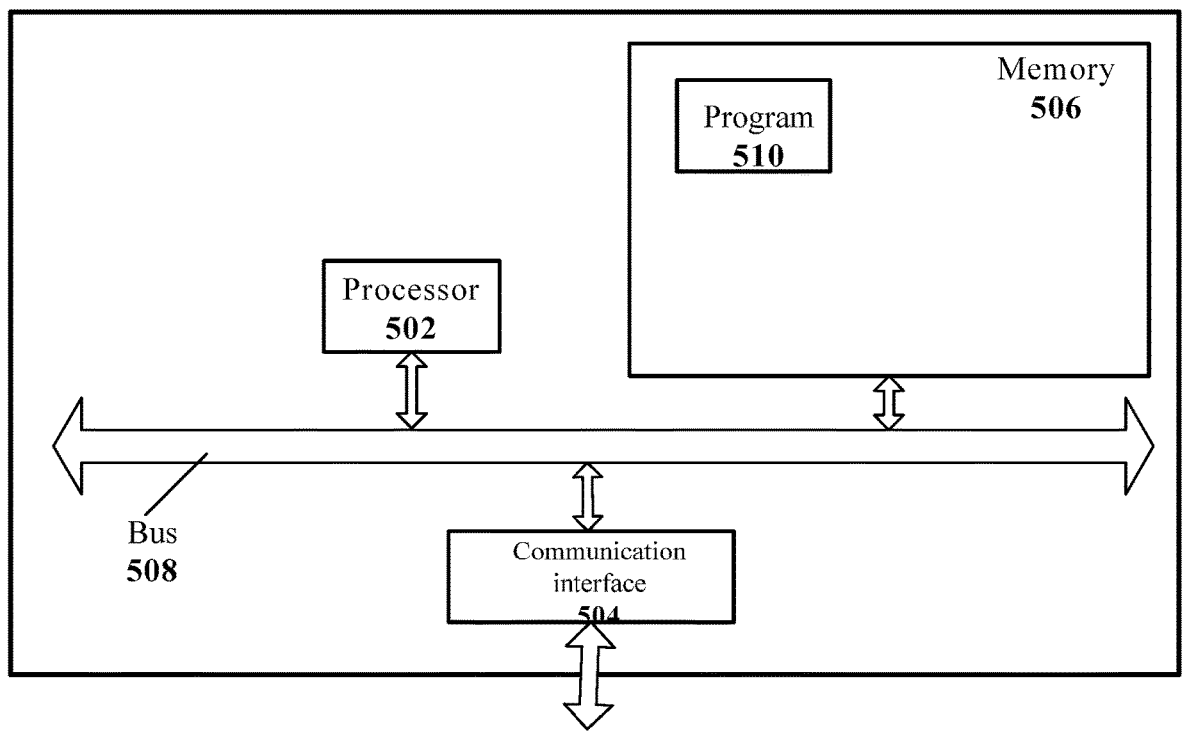
FIG. 11 is a structural schematic diagram illustrating a terminal according to an embodiment of the present invention.

FIG. 11 is a structural schematic diagram illustrating a terminal according to an embodiment of the present invention. The specific implementation of the terminal is not limited in the specific embodiments of the present invention.

As shown in FIG. 11, the terminal may include a processor 502, a communication interface 504, a memory 506 and a communication bus 508.

The processor 502, the communication interface 504 and the memory 506 are in communication with each other via the communication bus 508.

The communication interface 504 is configured to communicate with a network element of other devices such as a client or another server.

The processor 502 is configured to execute a program 510 and specifically, perform the steps of the embodiments of the above method for determining a travel path bound.

Specifically, the program 510 may include a program code including a computer operation instruction.

The processor 502 may be a central processing unit (CPU), or an application-specific integrated circuit (ASIC), or configured as one or more integrated circuits for implementing the embodiments of the present invention. The terminal includes one or more processors which may be processors of same type, for example, one or more CPUs, or may be processors of different types, for example, one or more CPUs and one or more ASICs.

The memory 506 is configured to store the program 510. The memory 506 may include a high speed RAM memory, or a non-volatile memory, for example, at least one disk memory.

The program 510 may be configured to cause the processor 502 to perform the following operations:

under a first coordinate system, according to contour point positions respectively corresponding to a vehicle and an obstacle in a path trajectory, determining a collision-anticipated overlap corner position;

based on a trajectory normal of the vehicle and the overlap corner position, determining a contour corner overlap line and a decision corner reference line, where the decision corner reference line is parallel to the trajectory normal, and the contour corner overlap line is covered, in an overlap way, on a collision-anticipated contour edge of the vehicle or the obstacle;

if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle;

under a second coordinate system, based on the collision-avoiding distance, generating a path bound for a path planning decision.

Apparently, persons skilled in the art shall understand that, the modules or steps in the present invention may be implemented by a general computing apparatus, and they may be centralized in an individual computing apparatus or distributed a network formed by a plurality of computing apparatuses. Optionally, they may be implemented by using program codes executable by the computing apparatus. Thus, they can be stored in a storage apparatus and executed by the computing apparatus. In some cases, the steps shown or described herein can be performed in a sequence different from the sequence or they may be fabricated into various integrated circuit modules or some modules or steps of them are fabricated into a single integrated circuit module for implementation. Hence, the present invention is not limited to any specific combination of hardware and software.

The above descriptions are made only to preferred embodiments of the present invention and shall not be intended to limit the present invention. Those skilled in the art can make various changes or modifications to the present invention. Any modifications, equivalent substitutions and improvements etc. made within the spirit and principle of the present invention shall all fall within the scope of protection of the present invention.

What is claimed is:

1. A method of determining a travel path bound, comprising:

under a first coordinate system, according to contour point positions respectively corresponding to a vehicle and an obstacle in a path trajectory, determining a collision-anticipated overlap corner position;

based on a trajectory normal of the vehicle and the overlap corner position, determining a contour corner overlap line and a decision corner reference line, wherein the decision corner reference line is parallel to the trajectory normal, and the contour corner overlap line is covered, in an overlap way, on a collision-anticipated contour edge of the vehicle or the obstacle;

if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle;

under a second coordinate system, based on the collision-avoiding distance, generating a path bound for a path planning decision.

2. The method of claim 1, wherein the overlap corner position comprises at least one primary overlap corner position and two auxiliary overlap corner positions, and based on the overlap corner position, the decision corner reference line and the contour corner positions on the contour corner overlap line, determining the collision-avoiding distance of the vehicle comprises:

if the primary overlap corner position is same as a vehicle contour corner position of the vehicle, based on the primary overlap corner position, obstacle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, wherein the contour corner overlap line is covered, in an overlap way, on a collision-anticipated contour edge of the obstacle and the obstacle contour corner positions;

if the primary overlap corner position is same as an obstacle contour corner position of the obstacle, based on the primary overlap corner position, the vehicle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, wherein the contour corner overlap line is covered, in an overlap way, on a collision-anticipated contour edge of the vehicle and the vehicle contour corner positions.

3. The method of claim 2, wherein based on the primary overlap corner position, the vehicle contour corner positions or the obstacle contour corner positions, and the auxiliary overlap corner positions, constructing the collision-avoiding translation line, and based on the primary overlap corner position and the second intersection position between the collision-avoiding translation line and the decision corner reference line, determining the collision-avoiding distance of the vehicle comprise:

based on vector directions of the auxiliary overlap corner positions and the primary overlap corner position relative to the trajectory normal, selecting a target auxiliary overlap corner position;

based on the target auxiliary overlap corner position and the primary overlap corner position, constructing a reference translation line, and based on a slope of the reference translation line and the vehicle contour corner positions or the obstacle contour corner positions, constructing the collision-avoiding translation line;

determining the second intersection position between the collision-avoiding translation line and the decision corner reference line and determining a distance between the second intersection position and the primary overlap corner position as the collision-avoiding distance.

4. The method of claim 3, wherein based on the slope of the reference translation line and the vehicle contour corner positions or the obstacle contour corner positions, constructing the collision-avoiding translation line comprises:

based on vector directions of the vehicle contour corner positions or the obstacle contour corner positions and the primary overlap corner position relative to the trajectory normal, selecting a target vehicle contour corner position or a target obstacle contour corner position, and based on the slope of the reference translation line and the target vehicle contour corner position or the target obstacle contour corner position, constructing the collision-avoiding translation line.

5. The method of claim 1, wherein based on the trajectory normal of the vehicle and the overlap corner position, determining the contour corner overlap line and the decision corner reference line comprises:

based on two auxiliary overlap corner positions in the overlap corner position, constructing the contour corner overlap line, and based on the primary overlap corner position in the overlap corner position and the slope of the trajectory normal, constructing the decision corner reference line.

6. The method of claim 1, wherein after, based on the trajectory normal of the vehicle and the overlap corner position, determining the contour corner overlap line and the decision corner reference line, the method further comprises:

if the first intersection position between the contour corner overlap line and the decision corner reference line is located on the contour edge, determining a distance between the first intersection position and the primary overlap corner position in the overlap corner position as the collision-avoiding distance.

7. The method of claim 1, wherein under the second coordinate system, based on the collision-avoiding distance, generating the path bound for the path planning decision comprises:

transforming the collision-avoiding distance into a collision-avoiding length under the second coordinate system;

based on a transverse distance between a target trajectory point in the path trajectory and the vehicle under the second coordinate system, coupling the collision-avoiding length with a decision length to obtain the path bound for the path planning decision.

8. The method of claim 1, wherein before, under the first coordinate system, according to the contour point positions respectively corresponding to the vehicle and the obstacle in the path trajectory, determining the collision-anticipated overlap corner position, the method further comprises:

under the second coordinate system, obtaining the path trajectory of the vehicle in a prediction trajectory frame, and transforming the path trajectory to be under the first coordinate system;

under the first coordinate system, based on a vehicle contour of the vehicle, determining vehicle contour point positions of the vehicle at the target trajectory points in the path trajectory;

under the first coordinate system, based on a perception system or a path map, obtaining at least one obstacle contour point position of the obstacle matching the target trajectory points in the path trajectory.

9. The method of claim 8, wherein based on the vehicle contour of the vehicle, determining the vehicle contour point positions of the vehicle at the target trajectory points in the path trajectory comprises:

calculating a heading angle of the target trajectory points in the path trajectory, and based on the heading angle and the vehicle contour, determining the vehicle contour point positions of the vehicle, wherein the contour point positions comprise four corner positions of the vehicle.

10. The method of claim 1, wherein before, based on the trajectory normal of the vehicle and the overlap corner position, determining the contour corner overlap line and the decision corner reference line, the method further comprises:
   obtaining a central point position of the vehicle and determining a perpendicular direction of the path trajectory;
   based on the perpendicular direction and the central point position, constructing the trajectory normal of the vehicle.

11. A method of planning a trajectory, comprising:
   according to the method of claim 1, determining a travel path bound of a vehicle;
   based on the travel path bound, determining a travel trajectory of the vehicle.

12. An apparatus for determining a travel path bound, comprising:
   one or more processors, and a non-transitory storage medium in communication with the one or more processors, the non-transitory storage medium configured to store program instructions, wherein, when executed by the one or more processors, the instructions cause the apparatus to perform:
   under a first coordinate system, according to contour point positions respectively corresponding to a vehicle and an obstacle in a path trajectory, determining a collision-anticipated overlap corner position;
   based on a trajectory normal of the vehicle and the overlap corner position, determining a contour corner overlap line and a decision corner reference line, wherein the decision corner reference line is parallel to the trajectory normal, and the contour corner overlap line is covered, in an overlap way, on a collision-anticipated contour edge of the vehicle or the obstacle;
   if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle;
   under a second coordinate system, based on the collision-avoiding distance, generating a path bound for a path planning decision.

13. The apparatus of claim 12, wherein the overlap corner position comprises at least one primary overlap corner position and two auxiliary overlap corner positions, and based on the overlap corner position, the decision corner reference line and the contour corner positions on the contour corner overlap line, determining the collision-avoiding distance of the vehicle comprises:
   if the primary overlap corner position is same as a vehicle contour corner position of the vehicle, based on the primary overlap corner position, obstacle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, wherein the contour corner overlap line is covered, in an overlap way, on a collision-anticipated contour edge of the obstacle and the obstacle contour corner positions;
   if the primary overlap corner position is same as an obstacle contour corner position of the obstacle, based on the primary overlap corner position, the vehicle contour corner positions, and the auxiliary overlap corner positions, constructing a collision-avoiding translation line, and based on the primary overlap corner position and a second intersection position between the collision-avoiding translation line and the decision corner reference line, determining the collision-avoiding distance of the vehicle, wherein the contour corner overlap line is covered, in an overlap way, on a collision-anticipated contour edge of the vehicle and the vehicle contour corner positions.

14. The apparatus of claim 13, wherein based on the primary overlap corner position, the vehicle contour corner positions or the obstacle contour corner positions, and the auxiliary overlap corner positions, constructing the collision-avoiding translation line, and based on the primary overlap corner position and the second intersection position between the collision-avoiding translation line and the decision corner reference line, determining the collision-avoiding distance of the vehicle comprise:
   based on vector directions of the auxiliary overlap corner positions and the primary overlap corner position relative to the trajectory normal, selecting a target auxiliary overlap corner position;
   based on the target auxiliary overlap corner position and the primary overlap corner position, constructing a reference translation line, and based on a slope of the reference translation line and the vehicle contour corner positions or the obstacle contour corner positions, constructing the collision-avoiding translation line;
   determining the second intersection position between the collision-avoiding translation line and the decision corner reference line and determining a distance between the second intersection position and the primary overlap corner position as the collision-avoiding distance.

15. The apparatus of claim 14, wherein based on the slope of the reference translation line and the vehicle contour corner positions or the obstacle contour corner positions, constructing the collision-avoiding translation line comprises:
   based on vector directions of the vehicle contour corner positions or the obstacle contour corner positions and the primary overlap corner position relative to the trajectory normal, selecting a target vehicle contour corner position or a target obstacle contour corner position, and based on the slope of the reference translation line and the target vehicle contour corner position or the target obstacle contour corner position, constructing the collision-avoiding translation line.

16. The apparatus of claim 12, wherein based on the trajectory normal of the vehicle and the overlap corner position, determining the contour corner overlap line and the decision corner reference line comprises:
   based on two auxiliary overlap corner positions in the overlap corner position, constructing the contour corner overlap line, and based on the primary overlap corner position in the overlap corner position and the slope of the trajectory normal, constructing the decision corner reference line.

17. The apparatus of claim 12, wherein after, based on the trajectory normal of the vehicle and the overlap corner position, determining the contour corner overlap line and the decision corner reference line, the method further comprises:

if the first intersection position between the contour corner overlap line and the decision corner reference line is located on the contour edge, determining a distance between the first intersection position and the primary overlap corner position in the overlap corner position as the collision-avoiding distance.

18. The apparatus of claim 12, wherein under the second coordinate system, based on the collision-avoiding distance, generating the path bound for the path planning decision comprises:

transforming the collision-avoiding distance into a collision-avoiding length under the second coordinate system;

based on a transverse distance between a target trajectory point in the path trajectory and the vehicle under the second coordinate system, coupling the collision-avoiding length with a decision length to obtain the path bound for the path planning decision.

19. The apparatus of claim 12, wherein before, under the first coordinate system, according to the contour point positions respectively corresponding to the vehicle and the obstacle in the path trajectory, determining the collision-anticipated overlap corner position, the method further comprises:

under the second coordinate system, obtaining the path trajectory of the vehicle in a prediction trajectory frame, and transforming the path trajectory to be under the first coordinate system;

under the first coordinate system, based on a vehicle contour of the vehicle, determining vehicle contour point positions of the vehicle at the target trajectory points in the path trajectory;

under the first coordinate system, based on a perception system or a path map, obtaining at least one obstacle contour point position of the obstacle matching the target trajectory points in the path trajectory.

20. An apparatus for planning a trajectory, comprising:

one or more processors, and a non-transitory storage medium in communication with the one or more processors, the non-transitory storage medium configured to store program instructions, wherein, when executed by the one or more processors, the instructions cause the apparatus to perform:

under a first coordinate system, according to contour point positions respectively corresponding to a vehicle and an obstacle in a path trajectory, determining a collision-anticipated overlap corner position;

based on a trajectory normal of the vehicle and the overlap corner position, determining a contour corner overlap line and a decision corner reference line, wherein the decision corner reference line is parallel to the trajectory normal, and the contour corner overlap line is covered, in an overlap way, on a collision-anticipated contour edge of the vehicle or the obstacle;

if a first intersection position between the contour corner overlap line and the decision corner reference line is not located on the contour edge, based on the overlap corner position, the decision corner reference line and contour corner positions on the contour corner overlap line, determining a collision-avoiding distance of the vehicle;

under a second coordinate system, based on the collision-avoiding distance, generating a path bound for a path planning decision; and, based on the path bound for a path planning decision, determining a travel trajectory of the vehicle.

\* \* \* \* \*